United States Patent
Lu et al.

(10) Patent No.: US 12,513,565 B2
(45) Date of Patent: Dec. 30, 2025

(54) OPTIMIZATION OF SYNCHRONIZATION SIGNAL BLOCK PERIODICITY

(71) Applicant: T-Mobile Innovations LLC, Overland Park, KS (US)

(72) Inventors: Kun Lu, Bellevue, WA (US); Egil Gronstad, Encinitas, CA (US); Jun Liu, Sammamish, WA (US); Jonathan Xayasy, Kent, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 357 days.

(21) Appl. No.: 18/303,088

(22) Filed: Apr. 19, 2023

(65) Prior Publication Data

US 2024/0357420 A1 Oct. 24, 2024

(51) Int. Cl.
*H04W 28/02* (2009.01)
(52) U.S. Cl.
CPC ... *H04W 28/0289* (2013.01); *H04W 28/0284* (2013.01)
(58) Field of Classification Search
CPC ............. H04W 28/02; H04W 28/0284; H04W 28/0289; Y02D 30/70
See application file for complete search history.

(56) References Cited

U.S. PATENT DOCUMENTS

| 11,564,152 B2 | 1/2023 | Bao et al. | |
| 2024/0214994 A1* | 6/2024 | Ning | H04L 5/005 |
| 2024/0298277 A1* | 9/2024 | Esswie | H04W 24/08 |
| 2025/0168763 A1* | 5/2025 | Agarwal | H04B 7/0626 |
| 2025/0203505 A1* | 6/2025 | Muhammad | H04W 52/0206 |

FOREIGN PATENT DOCUMENTS

| WO | WO-2022247644 A1 * | 12/2022 | ............ H04W 72/04 |
| WO | WO-2023048634 A1 * | 3/2023 | ........ H04W 52/0206 |
| WO | WO-2024034476 A1 * | 2/2024 | .......... H04W 28/086 |

OTHER PUBLICATIONS

Merriam-Webster, Definition of "When", https://www.merriam-webster.com/dictionary/when (Year: 2025).*
3GPP, Radio Resource Control (RRC) protocol specification (Release 17), Mar. 2023, 3GPP TS 38.331 V17.4.0, pp. 1-1324 (Year: 2023).*

* cited by examiner

*Primary Examiner* — Paul H. Masur
(74) *Attorney, Agent, or Firm* — Jones Robb, PLLC

(57) ABSTRACT

Systems and methods are provided for synchronization signal block (SSB) periodicity optimization in a wireless network. A method includes measuring a network load and comparing the measured network load to a first predetermined threshold. The method further includes automatically adjusting an SSB periodicity when the network load meets the first predetermined threshold.

20 Claims, 9 Drawing Sheets

OPTIMIZATION OF SYNCHRONIZATION SIGNAL BLOCK PERIODICITY

TECHNICAL BACKGROUND

A wireless network, such as a cellular network, can include a core network and a radio access network (RAN) serving multiple wireless devices or user equipment (UE) in a geographical area covered by a radio frequency transmission provided by the RAN. As technology has evolved, different carriers within the cellular network may utilize different types of radio access technologies (RATs). RATs can include, for example, third generation (3G) RATs (e.g., WCDMA, UMTS, CDMA etc.), fourth generation (4G) RATs (e.g., WiMax, LTE, etc.), and fifth generation (5G) RATs (new radio (NR)). Further, different types of access nodes may be implemented within the access network for deployment for the various RATs. For example, an evolved NodeB (eNodeB or eNB) may be utilized for 4G RATs and a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages.

In addition to their benefits, the evolving technologies such as 5G can lead to increased energy usage and detrimental environmental impact. Contributing factors include the handling of advanced services and applications requiring very high data rates, the use of denser networks, an increased number of antennas, larger bandwidths, and more frequency bands. Energy consumption is often concentrated within the RAN. Energy consumption within the RAN includes a dynamic part and a static part. The dynamic part occurs only when data transmission and/or reception between wireless devices and the RAN is ongoing and the static part occurs all of the time in order to maintain necessary operation, even when data transmission and reception are not ongoing. One static component that increases energy usage is the synchronization signal block (SSB), which is currently sent periodically by an access node to wireless devices within the network. The SSB carries specific signals for establishing downlink synchronization. Wireless devices utilize the SSB to measure and identify an optimal beam with the strongest signal from the access node. The periodicity of the SSB is fixed and occurs constantly to allow the wireless devices to determine cell conditions. However, the transmission of the SSB during periods of low network load leads to unnecessarily high network energy consumption. Accordingly, a solution is needed for reducing energy consumption required for SSB transmission.

OVERVIEW

Exemplary embodiments include a method for reducing radio access network (RAN) energy consumption through adaptive synchronization signal block (SSB) periodicity setting. In one exemplary embodiment, the method includes periodically transmitting a synchronization signal block (SSB) from an access node. The method further includes measuring a network load and comparing the measured network load to a first predetermined threshold. When the network load meets the first predetermined threshold, the method automatically adjusts SSB periodicity. Further embodiments disclosed herein are capable of creating and implementing a model for application to network conditions in order to automatically adjust periodicity of the SSB based on application of the model to the input network conditions.

Exemplary embodiments additionally include an SSB periodicity controller for reducing energy consumption within a RAN. The SSB periodicity controller includes a memory storing instructions and a processor executing the stored instruction. The execution of the stored instructions by the processor causes multiple steps to be performed including measuring a network load and comparing the measured network load to a first predetermined threshold. The steps further include automatically adjusting a synchronization signal block (SSB) periodicity when the network load meets the first predetermined threshold.

Exemplary embodiments further include a non-transitory computer-readable medium storing instructions executed by a processor to perform multiple steps. The steps include periodically transmitting a synchronization signal block (SSB) from an access node and measuring a network load. The steps further include comparing the measured network load to a first predetermined threshold and automatically adjusting an SSB periodicity when the network load meets the first predetermined threshold.

DETAILED DESCRIPTION

Figure 1:
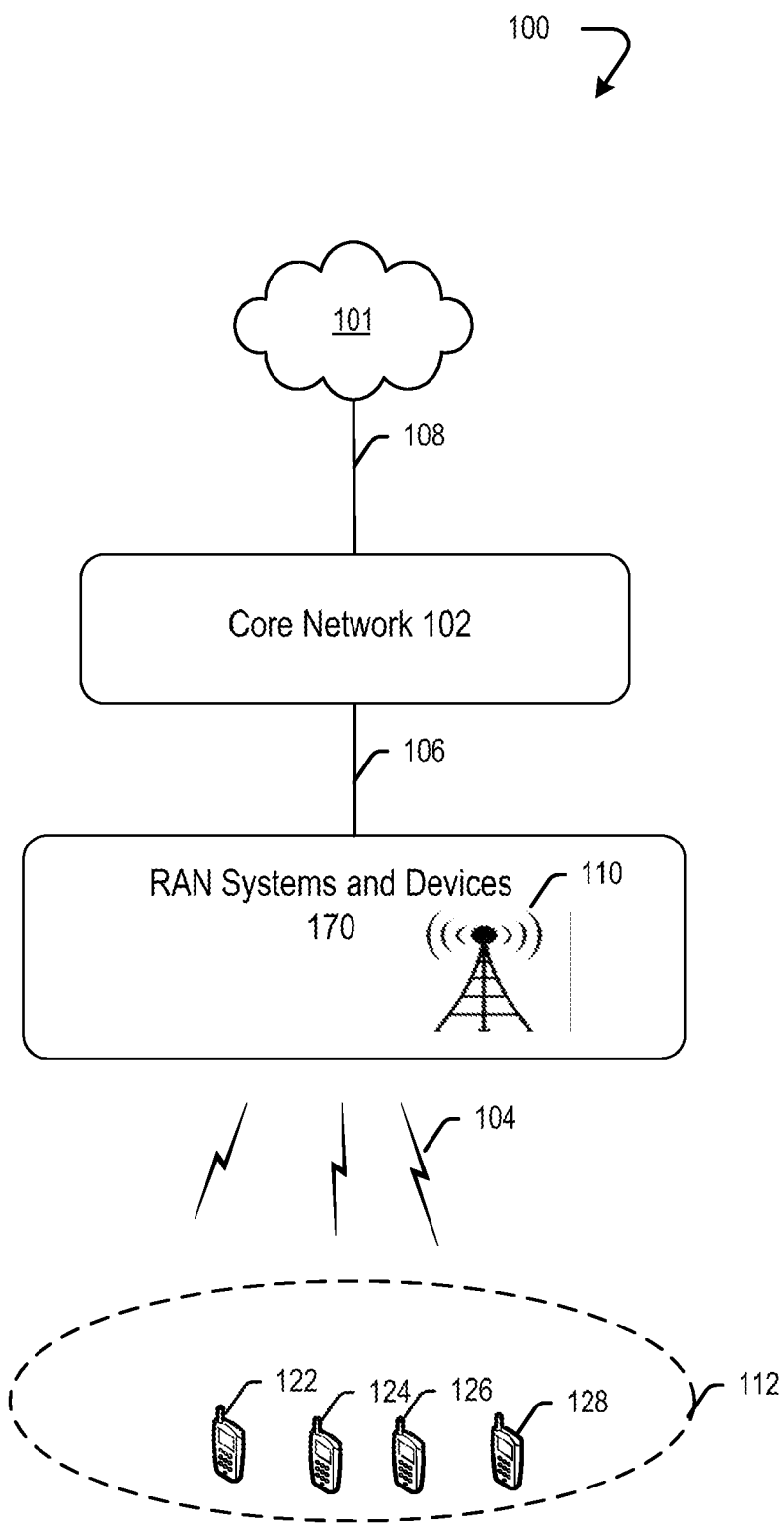
FIG. 1 depicts an exemplary system for wireless communication, in accordance with the disclosed embodiments.

Exemplary embodiments described herein include methods, devices and systems, and non-transitory computer readable mediums for synchronization signal block (SSB) periodicity optimization within a wireless network. The SSB is used to carry out cell search and identification to initialize a connection between wireless devices and the access node. Embodiments disclosed herein include an SSB periodicity controller located at an access node or within a processing node or elsewhere in a network for optimizing the periodicity of SSB signals. When the network load meets a predetermined threshold or other predetermined conditions, the SSB periodicity controller automatically adjusts SSB periodicity. In embodiments set forth herein, the SSB periodicity controller utilizes a trained model to adjust SSB periodicity based on existing network conditions.

In 5G NR networks, the SSB combines a primary synchronization signal (PSS), a secondary synchronization signal (SSS) and the physical broadcast channel PBCH block, to provide synchronization and master system information for wireless devices to detect and camp on a 5G NR Cell. For example, the wireless devices acquire time and frequency synchronization with a cell and detect a physical layer cell ID (PCI) of the cell. During cell search operations which are carried out when a wireless device is powered ON, the wireless devices use the SSB to derive necessary information required to access the cell.

The synchronization signals can also be used by the wireless device for signal to interference and noise ratio (SINR), reference signal received power (RSRP), and reference signal received quality (RSRQ)) measurements. These values may be measured and reported by the wireless devices over a communication network to an access node. Additional signal performance parameters may be reported, including, for example, channel quality indicator (CQI), and rank index (RI).

The access node, such as a gNB in 5G NR, transmits the SSB as a downlink signal even during periods in which no user data is exchanged between wireless devices and the access node. Each SSB occupies four orthogonal frequency-division multiplexing (OFDM) symbols in the time domain and is spread over 240 subcarriers or 20 resource blocks in the frequency domain. Thus, transmission of the SSB at frequent intervals is a major contributing factor to network energy consumption. While longer SSB periodicities enhance network energy performance, the shorter periodicities facilitate a faster cell search for wireless devices.

Most of the energy consumption in wireless networks comes from the RAN and in particular from the active antenna unit (AAU), with data centers and fiber transport accounting for a smaller share. The power consumption of the RAN can be split into two parts: the dynamic part which is only consumed when data transmission/reception is ongoing, and the static part which is consumed all the time to maintain the necessary operation of the radio access devices, even when the data transmission/reception is not on-going. Thus, SSB transmissions are considered to be a static part of power consumption in the wireless network. The typical periodicity of the SSB transmission in 5G networks is 20 ms. However, based on the 3GPP specification (38.331 6.3.2) the periodicity can be set from five (5) ms to one hundred sixty (160) ms. The 3GPP standard recommends using a periodicity of 20 ms for cell defining SSBs. Although higher periodicities, such as 80 ms or 160 ms may be utilized, these are preferably used for SSBs in particular types of networks, such as millimeter wave networks in order to allow more time for the transmission of a higher number of SSBs. In any case, once the SSB periodicity is set within a network, it is static and remains the same.

Thus, the periodicity setting determines the tradeoff between network energy consumption and wireless device accommodation based on the SSB signal. Although the specification allows for different periodicities, the periodicity is static within wireless networks. Thus, during periods of low network load, the frequent SSB transmissions are responsible for most of network energy consumption.

Accordingly, embodiments set forth herein adjust the periodicity of SSB transmission based on the network load. Increasing the time between SSB transmissions serves to reduce network energy consumption. Accordingly, embodiments set forth herein alter SSB periodicity to reduce network energy consumption during periods having a network load meeting a threshold value. The network load can be measured for example, based on physical resource block (PRB) consumption at one or more access nodes or based on a number of wireless devices connected to the one or more access nodes.

Furthermore, because multiple factors are correlated with a diminished network load, artificial intelligence (AI) can be used to train and apply a model correlating various factors with network load. For example, during daytime hours, network load may be at a normal level and a default SSB transmission periodicity may be implemented within the network. However, overnight, network load may typically be low and may meet a low threshold value. Furthermore, certain times of the year of may have lower network loads than other times of year. Weekends may have lower network loads than weekdays. Accordingly, time-related factors may be incorporated in the trained model to determine a likely network load. Additionally, location-related factors may also be incorporated in the model. For example, urban areas may typically experience a higher network load than suburban areas. Yet suburban areas may experience a higher network load than rural areas. Thus, location related factors may also be incorporated in the model illustrative of network load. The SSB periodicity controller may apply the model to existing data in order to automatically adjust SSB periodicity. In some embodiments, the SSB periodicity controller may incorporate a multi-tiered threshold to switch between three or more different periodicities based on input data from a clock, location tracker, or other mechanism.

With evolving 5G networks becoming more pervasive, concerns arise with respect to detrimental environmental impact. Because network energy saving is of great importance for environmental sustainability, it is desirable to provide an automated mechanism for SSB transmission periodicity adjustment. The changes to SSB transmission periodicity are automatically implemented over time such that the periodicity is greater during periods of light load and smaller (shorter intervals) during periods correlated with heavier load. For example, embodiments set forth herein may utilize a default periodicity of 20 ms, but may increase the periodicity to 40 ms, 80 ms, or 160 ms during lighter load and decrease periodicity to 10 ms or 5 ms during periods of heavier load. Further, the SSB periodicity controller may be located within an access node or within a processing node located in the RAN, in the core network, or as an independently accessible component.

FIG. 1 depicts an exemplary system 100 for wireless communication, in accordance with the disclosed embodiments. The system 100 may include a communication network 101, core network 102, a radio access network (RAN) 170 including at least one access node 110 and multiple wireless devices 122, 124, 126, and 128 able to communicate within the network. The wireless devices 122, 124, 126, and 128 may be end-user wireless devices and may operate within one or more coverage areas 112 and communicate with the RAN 110 over communication links 104, which may for example be 5G NR communication links, 4G LTE communication links, or any other suitable type of communication link.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network may have an evolved packet core (EPC) structure or may be structured using a service-based architecture (SBA). The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QoS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 120, 130, 140 and is responsible for handling connection and mobility management tasks. The SMF is primarily responsible for creating updating and removing sessions and managing session context. The UDM function provides services to other core functions, such as the AMF, SMF, and NEF. The UDM function may function as a stateful message store, holding information in local memory. The NSSF can be used by the AMF to assist with the selection of network slice instances that will serve a particular device. Further, the NEF provides a mechanism for securely exposing services and features of the core network.

Communication links 106 and 108 can use various communication media, such as air, space, metal, optical fiber, or some other signal propagation path-including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106 and 108 can be direct links or might include various equipment, intermediate components, systems, and networks, such as a cell site router, etc. Communication links 106 and 108 may comprise many different signals sharing the same link. Communication links 106 and 108 may be associated with many different reference points, such as N1-Nxx, as well as S1-Sxx, etc.

The RAN 170 may include various access network systems and devices such as access node 110. The RAN 170 is disposed between the core network 102 and the end-user wireless devices 122, 124, 126, 128. Components of the RAN 170 may communicate directly with the core network 102 and others may communicate directly with the end user wireless devices 122, 124, 126, 128. The RAN 170 may provide services from the core network 102 to the end-user wireless devices 122, 124, 126, and 128.

The RAN 110 includes at least an access node (or base station), such as an eNodeB, a next generation NodeB (gNodeB) 110 communicating with the plurality of end-user wireless devices 122, 124, 126, 128. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes 110 can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110 may comprise a short range, low power, small-cell access node such as a microcell access node, a picocell access node, a femtocell access node, or a home eNodeB device. As will be further described below, functionality for tagging requests from wireless devices may be included within the access nodes. Access nodes 110 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110 can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Furthermore, in embodiments set forth herein, the access nodes 110 periodically transmit an SSB to the wireless devices 122, 124, 126, 128.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. In embodiments disclosed herein, relay traffic may be tagged with an elevated priority.

Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices 122, 124, 126 128 may be or include high power wireless devices or standard power wireless devices. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for optimizing periodicity of SSB transmissions from the access node 110 to the wireless devices 122, 124, 126, 128 may be implemented as computer-readable instructions or methods, and processing nodes on the network for executing the instructions or methods. The processing node may include a processor included in the access node or a processor included in any controller node in the wireless network that is coupled to the access node.

Figure 2:
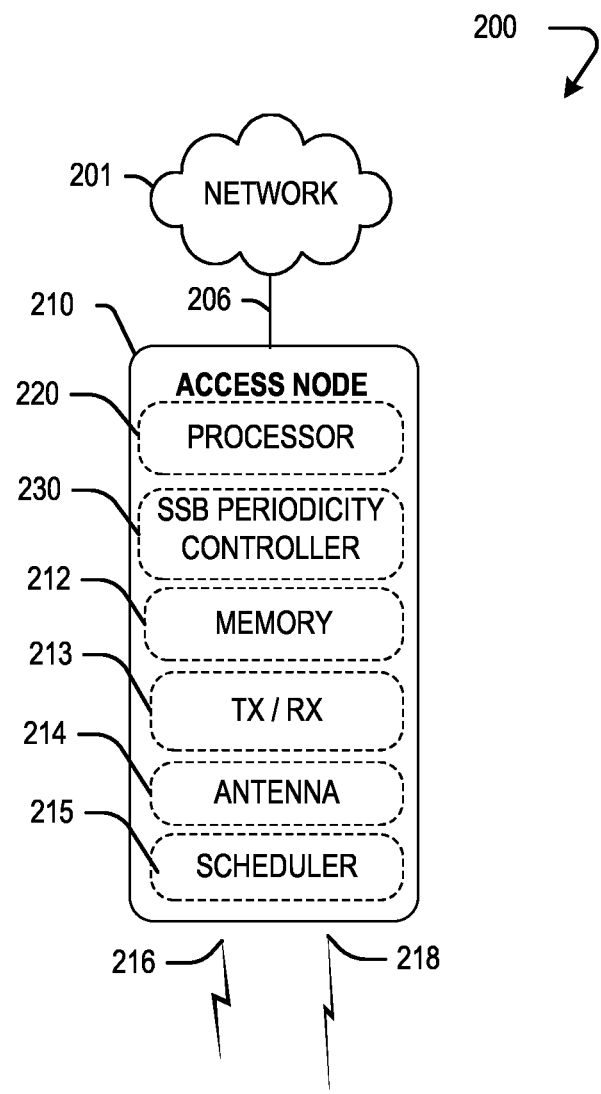
FIG. 2 illustrates an exemplary configuration of an access node in accordance with disclosed embodiments.

FIG. 2 illustrates an operating environment 200 for an exemplary access node 210 in accordance with the disclosed embodiments. In exemplary embodiments, access node 210 can include, for example, a gNodeB or an eNodeB. Access node 210 may comprise, for example, a macro-cell access node, such as access node 110 described with reference to FIG. 1. Access node 210 is illustrated as comprising a processor 220, an SSB periodicity controller 230, a memory 212, transceiver(s) 213, and antenna(s) 214. Processor 220 executes instructions stored on memory 212, while transceiver(s) 213 and antenna(s) 214 enable wireless communication with other network nodes, such as wireless devices and other nodes. For example, wireless devices may initiate uplink transmissions such that the transceivers 213 and antennas 214 receive messages from the wireless devices, for example, over communication links 216 and 218 and pass the messages to a mobility entity in the core network. Further, the transceivers 213 and antennas 214 receive signals from the mobility entity such as a mobility management entity (MME) or access and mobility function (AMF) and pass the messages to the appropriate wireless device. Scheduler 215 may be provided for scheduling resources based on the presence and performance parameters of the wireless devices as well as based on policies transmitted from the core network. Network 201 may be similar to the network 101 discussed above with respect to FIG. 1.

In embodiments provided herein, processor 220 may operate in conjunction with scheduler 215 and SSB periodicity controller 230 to schedule SSB transmissions from the access node 210. In operation, the SSB periodicity controller 230 receives measured data and/or data from a trained model to determine an optimal SSB transmission periodicity for a particular location and timeframe. In embodiments provided herein, the SSB periodicity controller 230 optimizes SSB transmission periodicity based on learned patterns over time and optimizes the periodicity to conserve network energy. In other embodiments, the SSB periodicity controller 230 compares measured data to thresholds stored in memory 212 in order to determine an optimal SSB periodicity for conserving energy and maintaining QoS.

While the processor 220, the SSB periodicity controller 230, and the scheduler 215 are shown as separate components, these components may optionally be integrated in various combinations. For example, the processor 220 may perform the functions described above with respect to the SSB periodicity controller 230 by accessing stored instructions from the memory 212. Alternatively, the function of the SSB periodicity controller 230 may be incorporated in the scheduler 215.

The access node 210 may utilize transceivers 213 and antennas 214 to communicate information, for example with the wireless devices and with the core network. For example, these components may receive requests from the wireless devices and further may receive instructions, such as policies, from the core network. Additionally, the transceivers 213 and antennas 214 may operate to ensure SSB transmission from the access node 210 to the wireless devices.

Figure 3:
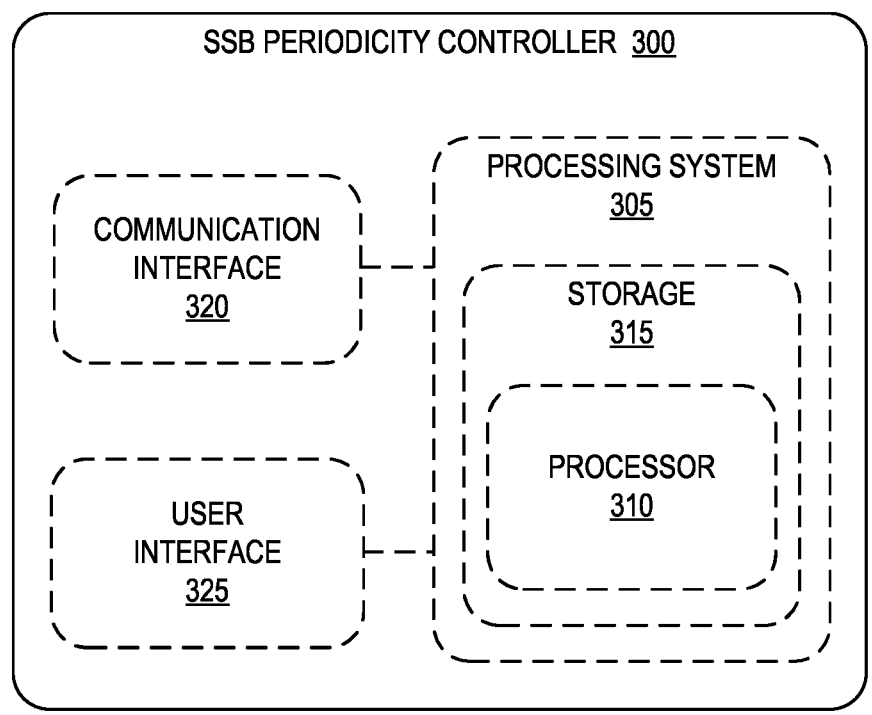
FIG. 3 is a block diagram illustrating an SSB periodicity controller in accordance with the disclosed embodiments.

FIG. 3 depicts an exemplary SSB periodicity controller 300, which may be configured to perform the methods and operations disclosed herein to optimize SSB transmission periodicity in order to conserve energy while maintaining QoS. In the disclosed embodiments, the SSB periodicity controller 300 may be integrated with the access node 210, the core network 102, or may be an entirely separate component capable of communicating with the access node 210.

The SSB periodicity controller 300 may be configured for assigning SSB periodicity based on different conditions, locations, and times. To perform the assignment, the SSB periodicity controller 300 may include a processing system 305. Processing system 305 may include a processor 310 and a storage device 315. Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. Processor 310 may be a microprocessor and may include hardware circuitry and/or embedded codes configured to retrieve and execute software stored in storage device 315.

The SSB periodicity controller 300 may include a communication interface 320 and a user interface 325. Communication interface 320 may be configured to enable the processing system 305 to communicate with other components, nodes, or devices in the wireless network. Communication interface 320 may include hardware components, such as network communication ports, devices, routers, wires, antenna, transceivers, etc. User interface 325 may be configured to allow a user to provide input to the SSB periodicity controller 300 and receive data or information from the SSB periodicity controller 300. User interface 325 may include hardware components, such as touch screens, buttons, displays, speakers, etc. The SSB periodicity controller 300 may further include other components such as a power management unit, a control interface unit, etc.

The SSB periodicity controller thus may utilize the memory 315 and the processor 310 to perform multiple operations. For example, the processor 310 may access stored instructions in the memory 310 to measure a network load, compare the measured network load to a first predetermined threshold that may be stored in the memory 315, and automatically adjust the SSB periodicity when the network load meets the first predetermined threshold. Measuring the network load may include, for example, measuring PRB usage at an access node. Further, in some embodiments, the SSB periodicity controller 300 may be disposed in the access node transmitting the SSB.

Further, in some embodiments, the SSB periodicity controller 300 may record the network load at multiple time frames and automatically adjust the SSB periodicity for any of the multiple time frames in response to the network load meeting the first predetermined threshold. As a further operation, the SSB periodicity controller 300 may compare the network load to a second predetermined threshold and adjust the SSB periodicity when the network load meets the second predetermined threshold. Thus, multiple SSB periodicities may be used over time within the same network and the SSB periodicity may be dynamically adjusted in accordance with embodiments set forth herein.

Furthermore, the SSB periodicity controller 300 may utilize artificial intelligence (AI) to automatically adjust SSB periodicity in accordance with historical patterns. For example, the processor 310 of the SSB periodicity controller 300 may train and implement a model incorporating load measurements over time to automatically adjust SSB periodicity within different timeframes and at different locations with a network. For example, the SSB periodicity controller 300 may measure network load at different predetermined locations, create the trained model based on these measurements, and automatically adjust the SSB periodicity in particular locations by applying the trained model. For example, the trained model may incorporate time frames during which the network load in any particular location meets a first predetermined threshold. Further, the trained model may incorporate a measurement indicating that the network load in a particular location always meets the first predetermined threshold and accordingly the SSB periodicity controller 300 may set a higher periodicity for that particular locations either at all times or at particular times.

Figure 4:
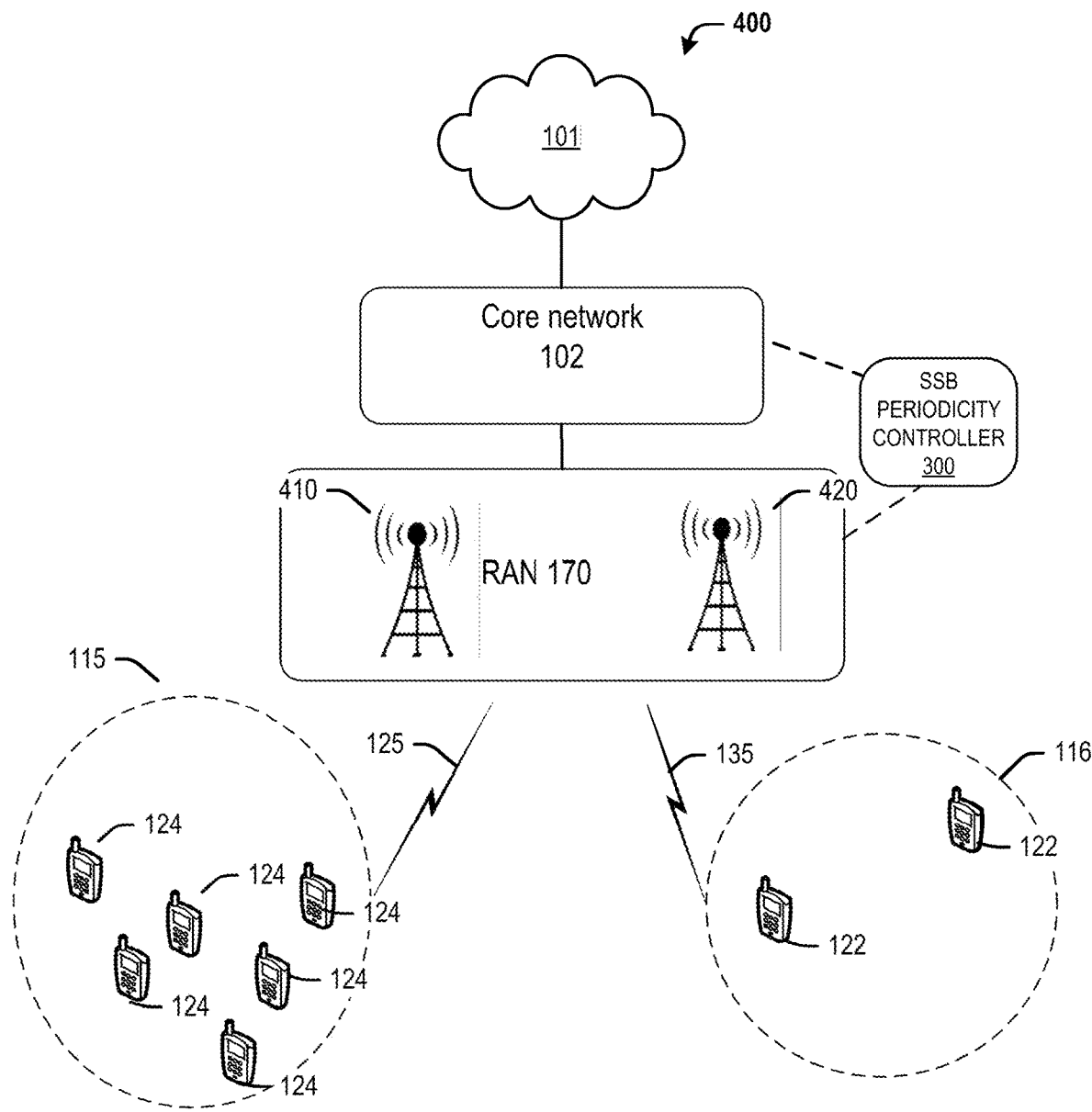
FIG. 4 is an exemplary system for wireless communication in accordance with an additional embodiment.

FIG. 4 depicts an exemplary system 400 for wireless communication, in accordance with the disclosed embodiments. The system 400 may include a communication network 101, core network 102, a radio access network (RAN) 170 including access nodes 410 and 420 and multiple wireless devices 122, 124 able to communicate within the network. The wireless devices 122, 124 may be end-user wireless devices and may operate within one or more coverage areas 115 and 116 communicate with the RAN 170 over communication links 125, 135 which may for example be 5G NR communication links, 4G LTE communication links, or any other suitable type of communication link.

While like reference numbers may refer to the elements described above with respect to FIG. 1, the system 400 may include more than one access node such as access nodes 410 and 420. Further, these access nodes 410 and 420 may have two different coverage areas 115 and 116. As illustrated, coverage area 115 may serve many wireless devices 124 and thus may considered to be heavily loaded. Coverage area 116 may be serving fewer wireless devices 122 and thus may be less heavily loaded. An SSB periodicity controller 300 may be a separate component that communicates with the access nodes 410 and 420 and may also communicate with the core network 102. The SSB periodicity controller 300 may be substantially as described above with respect to FIG. 3 and may control the periodicity of the SSB transmissions from the access nodes 410 and 420. For example, the SSB periodicity controller 300 may cause the SSB transmissions to occur more frequently from the access node 410 than from the access node 420 due to the heavy loading in the coverage area of the access node 410.

Figure 5:
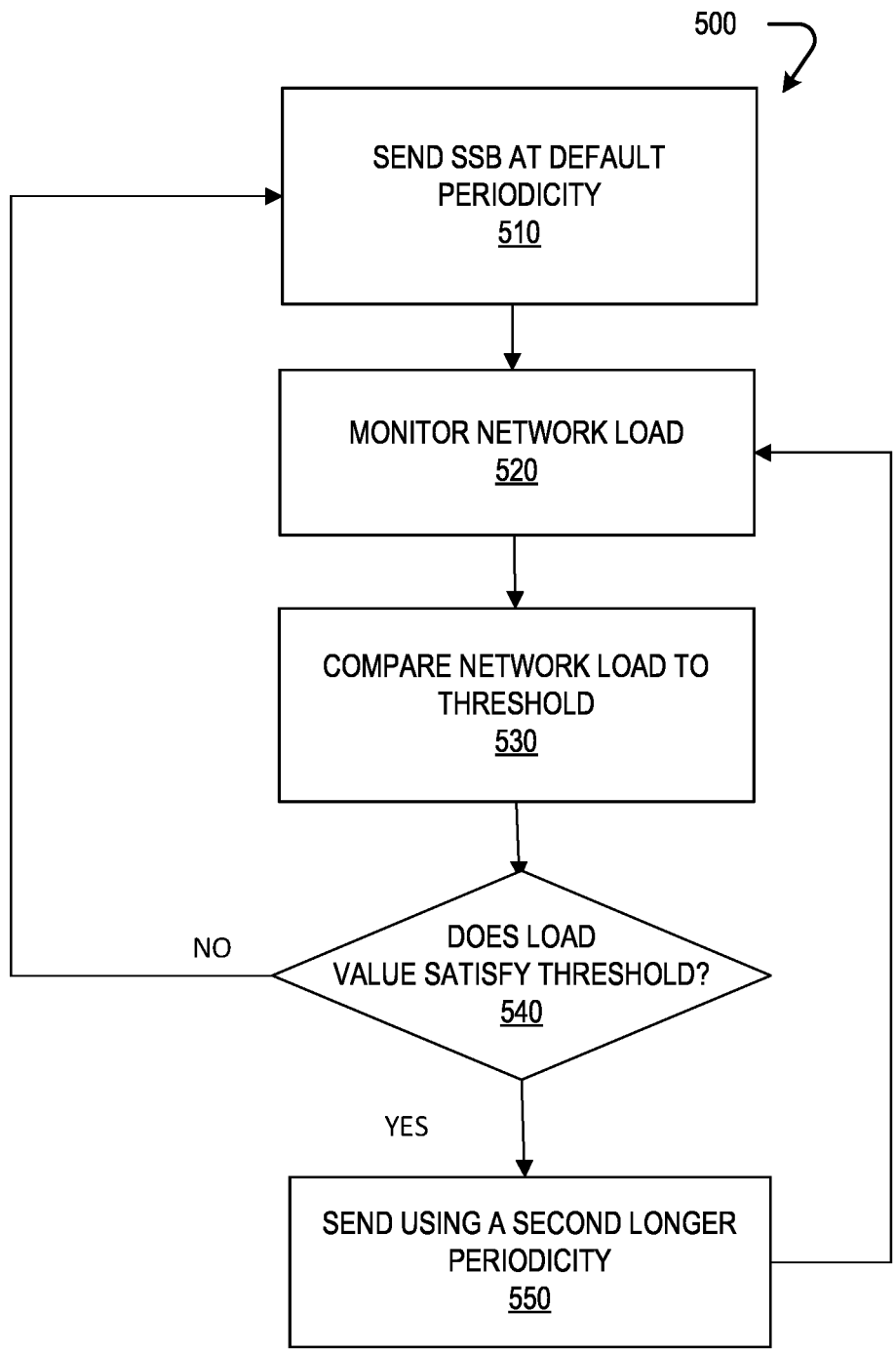
FIG. 5 is a flow chart depicting a method for SSB periodicity optimization in accordance with disclosed embodiments.

FIG. 5 is a flow chart depicting an exemplary method 500 for controlling an SSB transmission periodicity. Method 500 may be performed by any suitable processor, for example, the processor 310 of the SSB periodicity controller 300 as shown in FIG. 3 or a processor of the access node 210 shown in FIG. 2. For purposes of discussion, the method is described as being performed by the access node 210. However, it should be understood that the access node 210 operates in conjunction with the SSB periodicity controller 230 and other components in order to accomplish the described steps.

In step 510, the access node 210 sends the SSB at a default periodicity. The default periodicity could be, for example, 20 ms. The SSB transmission enables beam selection through measurement of various parameters, such as, for example SINR, RSRP, and RSRQ.

In step 520, the access node 210 monitors network load. Monitoring of network load may include, for example, monitoring PRB usage at the access node. For example, monitoring of the network load in step 520 may include determining a percentage of available PRBs that are currently in use. Alternatively, monitoring network load includes determining a number of wireless devices connected to the access node. As a further alternative, monitoring of the network load in step 520 includes determining a noise level based on, for example, SINR or RSRQ.

In step 530, the access node 210 compares the network load to a threshold. The threshold may, for example, be a percentage of PRB usage, a number of connected wireless devices, or a noise level represented by SINR or RSRQ.

In step 540, the access node 210 determines whether the measured load value satisfies the threshold. For example, the threshold may be a threshold low value, such as 25 percent of PRB usage. If more than 25 percent of PRBs are being utilized, the measured value does not meet the threshold. However, if 25 percent of PRBs or less than 25 percent of PRBs are being utilized, then the threshold is satisfied in step 640.

If the measured load does not meet the threshold, i.e., the load is higher than the threshold in step 540, the access node returns to transmitting the SSB at the default periodicity in step 510. However if the measured load satisfies the threshold in step 540, the access node transmits the SSB using a longer periodicity in step 550. For example, if the default periodicity is 20 ms, the access node 210 begins transmitting the SSB every 40 ms to conserve energy within the network.

Figure 6:
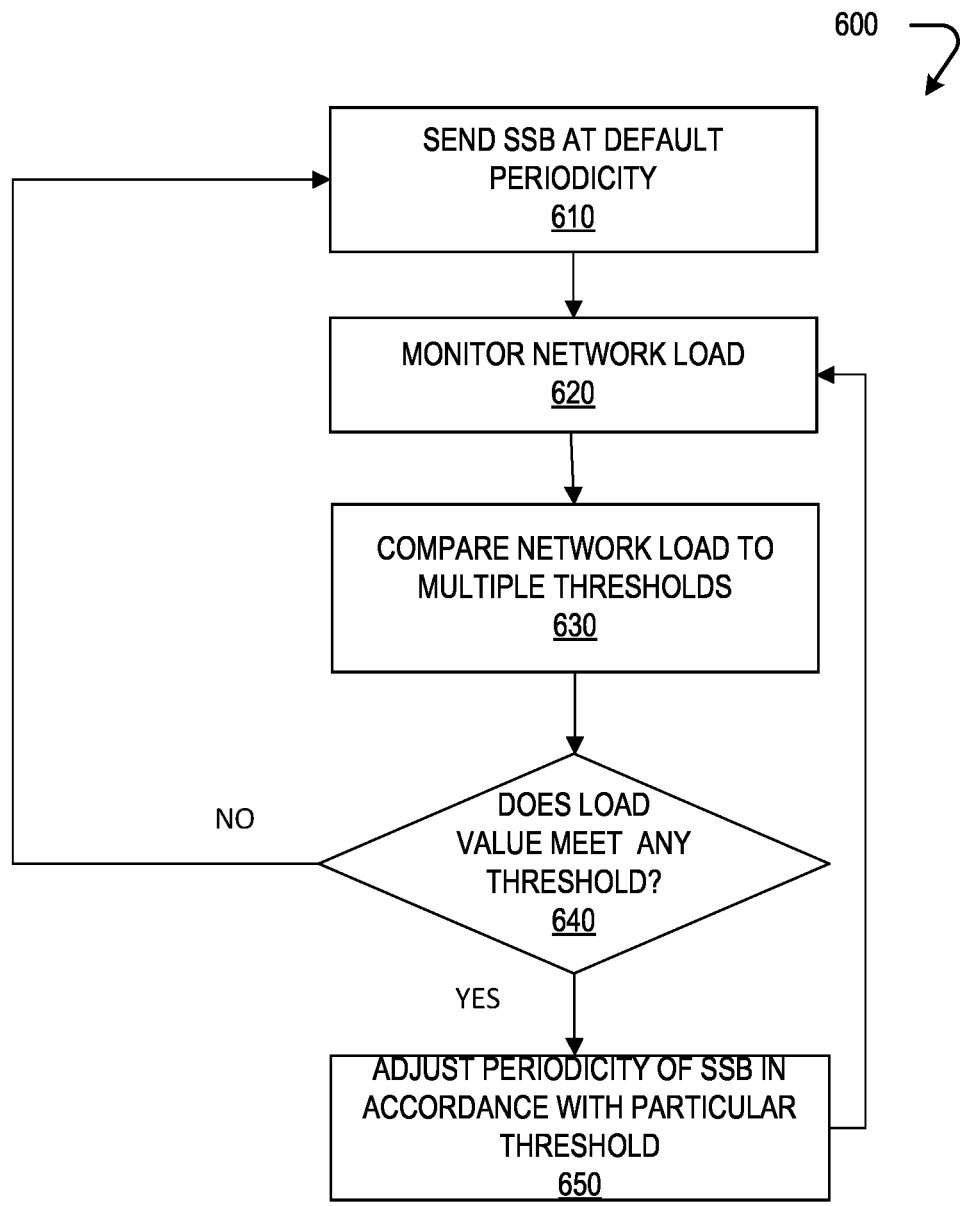
FIG. 6 is a flow chart depicting a further method for SSB periodicity optimization in accordance with the disclosed embodiments.

FIG. 6 is a flow chart depicting a further exemplary method 600 for optimizing SSB transmission periodicity. Method 600 may be performed by any suitable processor, for example, the processor 310 of the SSB periodicity controller as shown in FIG. 3. The method 600 may alternatively be performed by the access node 210 and the access node 210 is described as performing the method 600 for purposes of illustration.

In step 610, the access node 210 sends the SSB at a default periodicity. The default periodicity could be, for example, 20 ms. In step 620, the access node 210 monitors network load. Monitoring of network load may include, for example, monitoring PRB usage at the access node. For example, monitoring of the network load in step 620 may include determining a percentage of available PRBs that are currently in use. Alternatively, monitoring network load includes determining a number of wireless devices connected to the access node. As a further alternative, monitoring of the network load in step 620 includes determining a noise level based on, for example, SINR or RSRQ.

In step 630, the access node 210 compares the network load to multiple thresholds. For example, a first resource usage threshold and a second resource usage threshold may be set for wireless devices connected to an access node, wherein the first and second resource usage thresholds include a PRB utilization percentage. For example, with respect to PRB usage, thresholds may include, for example, a first threshold of 50 percent, a second threshold of 30 percent, and a third threshold of 10 percent. In step 640, the access node 210 determines if the load value meets any threshold. For example, when the network load is measured at 40 percent PRB usage, the network load would then meet the first threshold, but not the second or third thresholds. When the network load is measured at 5 percent, it would meet all three exemplary thresholds.

Each threshold may have an associated SSB periodicity. Thus, in step 650, the access node 210 adjusts the periodicity of SSB transmission in accordance with the particular threshold met. For example, when the first threshold is met, the access node 210 may change the periodicity to 40 ms. When the second threshold is met, the access node 210 may adjust the periodicity to 80 ms and when the third threshold is met, the access node 210 may adjust the periodicity to 160 ms. However, if no threshold is met in step 640, the access node continues to transmit the SSB at the default periodicity.

Figure 7:
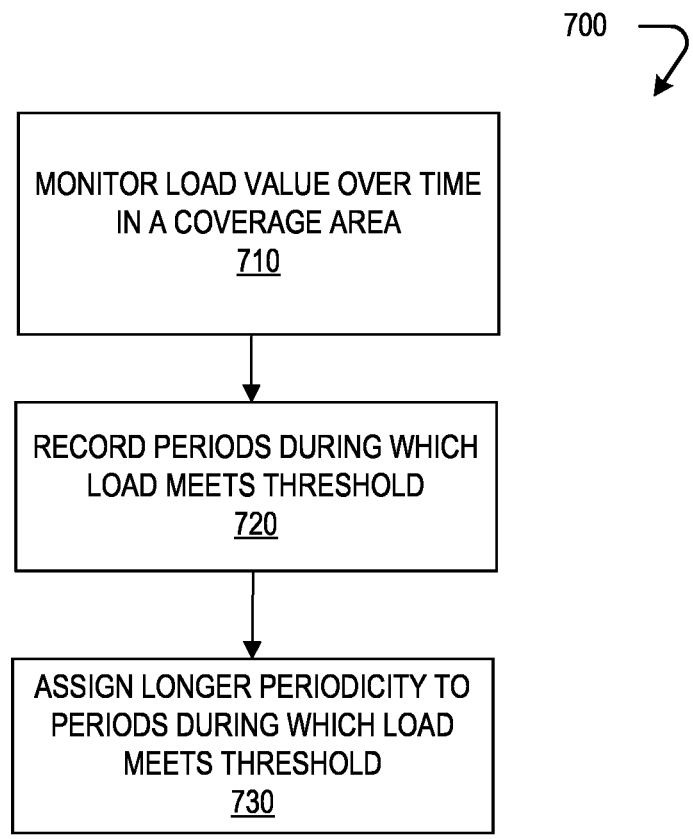
FIG. 7 is a flow chart depicting a further method for SSB periodicity optimization in accordance with disclosed embodiments.

FIG. 7 is a flow chart illustrating a method 700 for load monitoring with an objective of creating a trained model for AI applications in accordance with additional disclosed embodiments. The method 700 may be performed by any suitable processor such as, for example, the processor 310 of the SSB periodicity controller. The method 700 may alternatively be performed by the access node 210 or another network component. For the sake of illustration, the method 700 is described as being performed by the SSB periodicity controller 300.

In step 710, the SSB periodicity controller 300 monitors a load value over time in a coverage area. For example, the SSB periodicity controller 300 monitors the load value over the course of twenty four hours or over the course of seven days. In step 720, the SSB periodicity controller records periods during which the load meets a particular threshold. For example, the SSB periodicity controller 300 records periods during which the PRB utilization falls below 50 percent. In step 730, the SSB periodicity controller 300 assigns a periodicity longer than the default periodicity to periods during which the PRB utilization is 50 percent or less.

Figure 8:
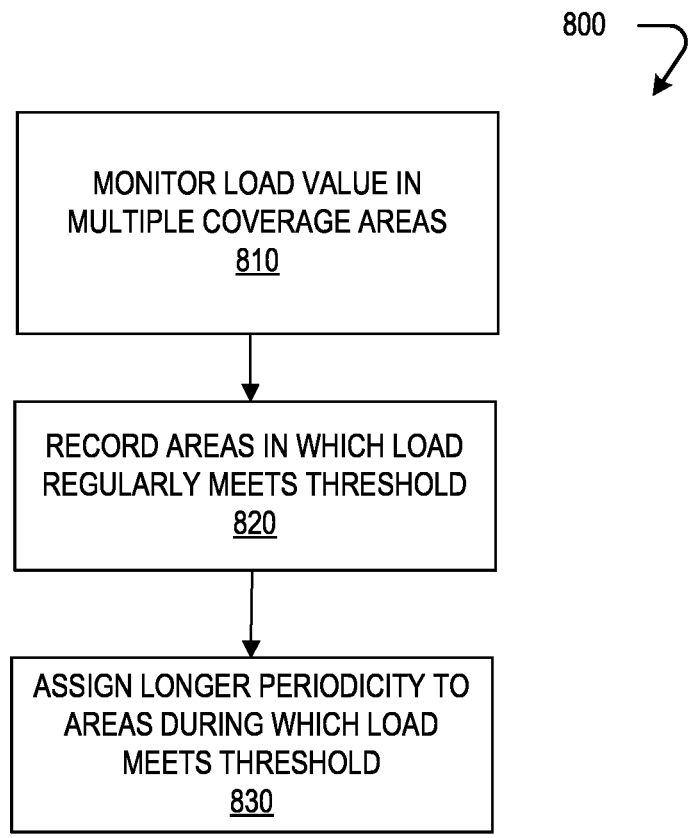
FIG. 8 is a flow chart depicting a further method for SSB periodicity optimization in accordance with the disclosed embodiments.

FIG. 8 is a flow chart illustrating a method 800 for load monitoring with an objective of creating a trained model for AI applications in accordance with additional disclosed embodiments. The method 800 may be performed by any suitable processor such as, for example, the processor 310 of the SSB periodicity controller. The method 700 may alternatively be performed by the access node 210 or another network component. For the sake of illustration, the method 800 is described as being performed by the SSB periodicity controller 300.

In step 810, the SSB periodicity controller 300 monitors a load value in multiple coverage areas. For example, with reference to FIG. 4 described above, the SSB periodicity controller 300 monitors the load over time in coverage areas 115 and 116. In step 820, the SSB periodicity controller 300 records areas in which the load regularly meets a threshold. For example, if the threshold is PRB utilization 50 percent or less, the SSB periodicity controller 300 may find that, in coverage area 116, the threshold is regularly met. Coverage area 116 may represent, for example, a rural area with few connected devices. Thus, in step 830, the SSB periodicity controller 300 assigns a longer periodicity to coverage areas where the load regularly meets the threshold. For example, coverage area 115 may have a load above the threshold and thus the periodicity may remain at a default value. However, the load in coverage area 116 may regularly meet the threshold and may therefore be assigned a longer periodicity so that the SSB transmission occurs less frequently in order to conserve network energy.

Figure 9:
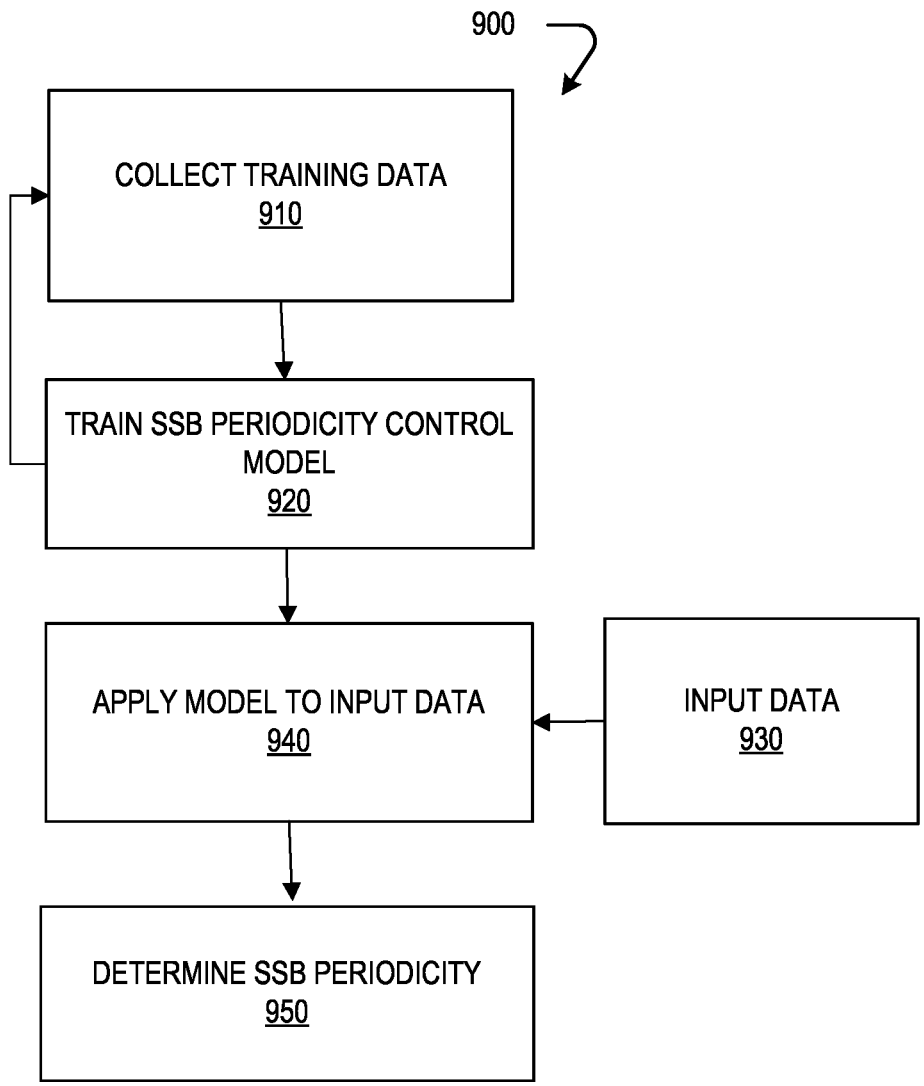
FIG. 9 is a flow chart depicting an additional method for SSB periodicity optimization in accordance with disclosed embodiments.

As illustrated in FIGS. 7 and 8, methods may be implemented to detect patterns and set periodicity based on those patterns. Accordingly, embodiments set forth herein may utilize artificial intelligence (AI) methods to assign periodicity. FIG. 9 illustrates a method 900 for optimizing periodicity using AI techniques. The method 900 may be performed by any suitable processor such as, for example, the processor 310 of the SSB periodicity controller. The method 700 may alternatively be performed by the access node 210 or another network component. For the sake of illustration, the method 900 is described as being performed by the SSB periodicity controller 300.

In step 910, the SSB periodicity controller collects training data. For example, step 910 may implement a combination of methods 700 and 800 to collect training data by measuring network load based on location, time, or other factors. In step 920, the SSB periodicity controller trains an SSB periodicity control model that correlates times, location, and network loads and sets thresholds for the times and locations. Training data may be continuously collected to refine the model. For example, the SSB periodicity controller 300 may train the optimization model by recording the network load over time and in different locations. For example, the SSB periodicity controller 300 may create an optimization model for a twenty four hour day throughout multiple coverage areas within a network. During some time frames within the twenty four hour day, the network load may meet first or second predetermined thresholds and during other time frames within the twenty four hour day, the network load may not meet the first or second predetermined threshold or may meet one threshold, but not another threshold. Further, the SSB periodicity controller 300 may create different models for different coverage areas. Thus, one or more trained models are created by measuring the network load in multiple predetermined locations or coverage areas. The models may also incorporate time, so that both time and location are factors for adjusting the SSB periodicity In step 930 data is input to the SSB periodicity controller 300 and the SSB periodicity controller 300 applies the model to the input data in step 940. For example, the input data may simply be a location or a time of day input by a clock or a tracker or other mechanism. Based on the input location or time of day, the SSB periodicity controller 300 is able to optimize SSB periodicity in step 950. For example the SSB periodicity controller 300 is able to optimize SSB periodicity for a time frame during which the network load meets the first predetermined threshold. Optimization may, for example including setting the SSB periodicity to, for example, 10 ms, 20 ms 40 ms, 60 ms, 80 ms, or 160 ms. In instances when the network load meets second predetermined threshold, the SSB periodicity controller 300 may adjust the SSB periodicity to a different value. Further, more than two thresholds may be utilized. Additionally, the SSB periodicity controller 300 may automatically adjusting the SSB periodicity for a predetermined location or coverage area. The adjustments may be made for the coverage area at various time frames based on a model combining time and location. Alternatively, the model may dictate a higher periodicity for certain coverage areas during all times.

Further, the trained model may determine instance in which the network load fails to meet predetermined thresholds such as the first predetermined threshold and the second predetermined threshold and automatically adjust the SSB periodicity to a previous or original SSB periodicity.

In some embodiments, methods 500, 600, 700, 800, and 900 may include additional steps or operations. Furthermore, the methods may include steps shown in each of the other methods. As one of ordinary skill in the art would understand, the methods 500, 600, 700, 800, and 900 may be integrated in any useful manner and the steps may be performed in any useful sequency.

The exemplary systems and methods described herein may be performed under the control of a processing system executing computer-readable codes embodied on a non-transitory computer-readable medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   periodically transmitting a synchronization signal block (SSB) from an access node in a radio access network (RAN), the SSB transmitted with a default periodicity, the access node utilizing an antenna to transmit the SSB with the default periodicity;
   measuring, at the access node, a network load by measuring a percentage of physical resource blocks (PRBs) utilized;
   comparing the measured network load to a first predetermined threshold associated with a predetermined percentage of PRBs utilized and determining the measured network load is less than or equal to the threshold; and
   automatically adjusting an SSB periodicity from the default periodicity to a longer periodicity in order to increase time between SSB transmissions and reduce energy consumption upon determining the network load is less than or equal to the first predetermined threshold.

2. The method of claim 1, wherein an SSB periodicity controller is incorporated in the access node.

3. The method of claim 1, further comprising utilizing a trained artificial intelligence (AI) model as an SSB optimization model to predict timeframes of the network load being less than or equal to the first predetermined threshold.

4. The method of claim 1, further comprising utilizing a trained artificial intelligence (AI) model as an SSB optimization model incorporating location-related factors to predict locations where network load is expected to be less than or equal to the predetermined threshold.

5. The method of claim 1, further comprising training an SSB optimization model by recording the network load over time and automatically adjusting the SSB periodicity for a time frame during which the network load is expected to be less than or equal to the first predetermined threshold based on the SSB optimization model.

6. The method of claim 5, further comprising creating the SSB optimization model using network load information for a twenty four hour period.

7. The method of claim 1, further comprising setting multiple predetermined load thresholds, each load threshold associated with a corresponding percentage of PRB usage.

8. The method of claim 7, wherein each of the multiple predetermined thresholds is associated with a different SSB periodicity.

9. The method of claim 1, further comprising comparing the network load to a second predetermined threshold lower than the first predetermined threshold and adjusting the SSB periodicity when the network load meets the second predetermined threshold.

10. The method of claim 1, further comprising determining the network load fails to be less than or equal to the first predetermined threshold and automatically adjusting the SSB periodicity to the default SSB periodicity.

11. The method of claim 1, further comprising training an SSB optimization model by measuring the network load in multiple predetermined locations and automatically adjusting the SSB periodicity for a predetermined location of the multiple predetermined locations.

12. A synchronization signal block (SSB) periodicity controller comprising:
a memory storing instructions; and
a processor executing the stored instruction to perform operations including:
measuring a network load in a radio access network (RAN) by measuring a percentage of physical resource blocks (PRBs) utilized;
comparing the measured network load to a first predetermined threshold associated with a predetermined percentage of PRBs utilized and determining the measured network load meets the threshold; and
automatically adjusting a synchronization signal block SSB) periodicity from a default periodicity to a first adjusted SSB periodicity upon determining the network load meets the first predetermined threshold, wherein the first adjusted SSB periodicity is longer than the default periodicity in order to increase time between SSB transmissions and reduce energy consumption in the RAN.

13. The SSB periodicity controller of claim 12, wherein the SSB periodicity controller is disposed in an access node periodically transmitting an SSB.

14. The SSB periodicity controller of claim 13, wherein measuring the network load comprises determining physical resource block (PRB) usage at the access node.

15. The SSB periodicity controller of claim 12, the operations further comprising utilizing a trained artificial intelligence (AI) model as an SSB optimization model to predict timeframes of the network load meeting the first predetermined threshold and and automatically adjusting the default SSB periodicity for any of the predicted time frames.

16. The SSB periodicity controller of claim 12, the operations further comprising comparing the network load to a second predetermined threshold and adjusting the SSB periodicity when the network load meets the second predetermined threshold, wherein the second predetermined threshold is lower than the first predetermined threshold and the first adjusted SSB periodicity is adjusted to a second adjusted SSB periodicity longer than the first adjusted SSB periodicity.

17. The SSB periodicity controller of claim 12, the operations further comprising utilizing a trained artificial intelligence (AI) model as an SSB optimization model incorporating location-related factors to predict locations where network load is expected to meet the predetermined threshold and automatically adjusting the SSB periodicity from the default periodicity in the predicted locations.

18. A non-transitory computer-readable medium storing instructions executed by a processor to perform steps comprising:
periodically transmitting a synchronization signal block (SSB) from an access node using an SSB periodicity set to a default periodicity;
measuring a network load in a radio access network (RAN) by measuring a percentage of physical resource blocks (PRBs) utilized;
comparing the measured network load to a first predetermined threshold associated with a predetermined percentage of PRBs utilized and determining the measured network load meets the threshold; and
automatically adjusting the SSB periodicity when the network load meets the first predetermined threshold, wherein the default periodicity is adjusted to a longer periodicity in order to increase time between SSB transmissions and reduce energy consumption in the RAN.

19. The non-transitory computer-readable medium of claim 18, the steps further comprising utilizing a trained artificial intelligence (AI) model as an SSB optimization model to predict time frames of the network load meeting the first predetermined threshold and automatically adjusting the default SSB periodicity for any of the predicted time frames.

20. The non-transitory computer-readable medium of claim 18, the steps further comprising further comprising utilizing a trained artificial intelligence (AI) model as an SSB optimization model incorporating location-related factors to predict locations where network load is expected to meet the predetermined threshold and automatically adjusting the default SSB periodicity for a predicted location.

* * * * *